United States Patent
Yoo et al.

(10) Patent No.: US 7,411,897 B2
(45) Date of Patent: Aug. 12, 2008

(54) METHOD AND APPARATUS FOR GENERATING AN EDGE SIDELOBE CANCELING SIGNAL AND UPLINK COMMUNICATION METHOD AND APPARATUS USING THE SAME IN AN OFDMA SYSTEM

(75) Inventors: Hwa-sun Yoo, Seoul (KR); Dae-sik Hong, Seoul (KR); Myong-hee Park, Incheon (KR); Yung-soo Kim, Seongnam (KR); Byung-jang Jeong, Suwon (KR)

(73) Assignees: Samsung Electronics Co., Ltd (KR); Yonsei University (KR)

( * ) Notice: Subject to any disclaimer, the term of this patent is extended or adjusted under 35 U.S.C. 154(b) by 917 days.

(21) Appl. No.: 10/718,304

(22) Filed: Nov. 20, 2003

(65) Prior Publication Data

US 2004/0114507 A1    Jun. 17, 2004

(30) Foreign Application Priority Data

Nov. 20, 2002    (KR) .................. 10-2002-0072534

(51) Int. Cl.
*H04J 11/00*    (2006.01)
(52) U.S. Cl. ...................... 370/208; 370/210
(58) Field of Classification Search .............. 370/208
See application file for complete search history.

(56) References Cited

U.S. PATENT DOCUMENTS 6,035,000 A    3/2000    Bingham 6,304,611 B1 *   10/2001   Miyashita et al. ........... 375/260
2002/0196734 A1 *  12/2002   Tanaka et al. ............... 370/210

FOREIGN PATENT DOCUMENTS

CN    1222276    7/1999

(Continued)

OTHER PUBLICATIONS

Van de Beek et al., "A Time and Frequency Synchronization Scheme for Multiuser OFDM", 48th IEEE Vehicular Technology Conference, May 18-21, 1998, pp. 1-32.

(Continued)

*Primary Examiner*—Chau T. Nguyen
*Assistant Examiner*—Suk Jin Kang
(74) *Attorney, Agent, or Firm*—The Farrell Law Firm, PC (57) ABSTRACT

An apparatus and method for generating an edge sidelobe canceling signal and an uplink communication apparatus using the same in an orthogonal frequency division multiplexing access (OFDMA) system. The uplink communication apparatus includes a transmitting terminal. The transmitting terminal includes a signal mapping unit, a serial-to-parallel conversion unit, an edge sidelobe canceling signal generation unit, an inverse fast Fourier transform (IFFT) unit, and a guard interval insertion and parallel-to-serial conversion unit. The edge sidelobe canceling signal generation unit generates an upper edge sidelobe canceling signal corresponding to an inner product of a transmission signal vector of the transmitting terminal and an optimized upper weight vector and a lower edge sidelobe canceling signal corresponding to an inner product of the transmission signal vector of the transmitting terminal and an optimized lower weight vector and allocates the upper and lower edge sidelobe canceling signals to subcarriers in guard intervals, respectively.

9 Claims, 5 Drawing Sheets

FOREIGN PATENT DOCUMENTS

| | | |
|---|---|---|
| EP | 1 142 247 | 9/2002 |
| JP | 11-027231 | 1/1999 |
| JP | 2000-509578 | 7/2000 |

OTHER PUBLICATIONS

Alikhani et al., "BDMA (Band Division Multiple Access)—A New Air-Interface for 3$^{rd}$ Generation Mobile System, UMTS, in Europe", Proc. ACTS Summit, Denmark, Oct. 1997, pp. 482-488.

Moose, "A Technique for Orthogonal Frequency Division Multiplexing Frequency Offset Correction", IEEE Transactions on Communications, vol. 42, No. 10, Oct. 1994, pp. 2908-2914.

Mohamed S. El-Tanany et al., OFDM Uplink for Interactive Broadband Wireless: Analysis and Simulation in the Presence of Carrier, Clock and Timing Errors, IEEE Transactions on Broadcasting, vol. 47, No. 1, Mar. 2001.

Robert Baldemair, Suppression of Narrow Frequency Bands in Multicarrier Transmission Systems, 2000.

Yuping Zhao et al., Intercarrier Interface Self-Cancellation Scheme for OFDM Mobile Communication System, IEEE Transactions on Communications, vol. 49, No. 7, Jul. 2001.

Hwasun Yoo et al., Edge Sidelobe Suppression Schemes for Uplink of Orthogonal Frequency Division Multiple Access Systems, 2002.

\* cited by examiner

METHOD AND APPARATUS FOR GENERATING AN EDGE SIDELOBE CANCELING SIGNAL AND UPLINK COMMUNICATION METHOD AND APPARATUS USING THE SAME IN AN OFDMA SYSTEM

PRIORITY

This application claims the priority of Korean Patent Application No. 2002-72534, filed on Nov. 20, 2002, in the Korean Intellectual Property Office, the disclosure of which is incorporated herein by reference.

BACKGROUND OF THE INVENTION

1. Field of the Invention

The present invention relates generally to orthogonal frequency division multiplexing access (OFDMA), and more particularly, to a method and apparatus for generating an edge sidelobe canceling signal for alleviating interference between users without causing additional bandwidth loss in an uplink, and an uplink communication method and apparatus using the same.

2. Description of the Related Art

Orthogonal frequency division multiplexing (OFDM) is a frequency-efficient modulation method that is robust to a frequency selective fading channel. Recently, OFDM has been positively considered and examined as a candidate technique for the next generation mobile communication. OFDM is a process of dividing a high-speed serial signal into a plurality of low-speed parallel signals and modulating them onto orthogonal subcarriers, respectively, for transmission or reception. Accordingly, the orthogonal subcarriers having a narrow bandwidth undergo flat fading so as to have generally good characteristics for the frequency selective fading channel. In addition, orthogonality between the subcarriers can be kept using a simple method such as insertion of a guard interval by a transmitting terminal, and therefore, a receiving terminal does not require a complex equalizer or a rake receiver in a direct sequence-code division multiplexing access (DS-CDMA) method. Due to these good characteristics, OFDM is employed as a standard modulation method for digital broadcasting, wireless local area network (LAN) such as IEEE 802.11a or HIPERLAN, fixed broadband wireless access, etc. In addition, OFDM has been considered as a candidate technique for modulation/demodulation and multiple access in a universal mobile telecommunications system (UMTS).

To accomplish next generation mobile communication by meeting the rapidly increasing users' demands for, for example, ultrahigh multimedia services, diverse multiple access methods based on OFDM have been researched and developed. Of those diverse multiple access methods, in an OFDMA method, data of each user comprises a subset of orthogonal subcarriers based on OFDM. In other words, among all of the orthogonal subcarriers, M adjacent subcarriers are grouped and defined as a single subband, and a plurality of subbands are allocated to different users. In a communication system employing such an OFDMA method, signals transmitted from user terminals, i.e., mobile stations, to a base station individually undergo an independent frequency offset. Accordingly, even though a receiving terminal, i.e., the base station, accurately estimates and compensates for each user's frequency offset, interference between users occurs.

During an uplink, a guard interval is used to prevent each user frequency offset from interfering with an adjacent user subband. The guard interval, in which $M_G$ subcarriers between adjacent subbands are not modulated, reduces interference by an adjacent subcarrier. When many guard intervals are allocated, however, a bandwidth loss increases although a signal-to-interference ratio (SIR) regarding each user frequency offset improves. In addition, when a modulation method of high bandwidth efficiency, such as an m-bit quadrature amplitude modulation (QAM), is employed to make the best use of advantages of an orthogonal multiple subcarrier system, a high SIR is required. Consequently, methods of alleviating interference using a guard interval have a limitation.

More specifically, in conventional OFDMA methods, for example, a method introduced by Concept group Beta ["OFDMA Evaluation Report—The Multiple Access Proposal for the UMTS Terrestrial Radio Air Interface (UTRA)," Tdoc/SMG 896/97, ETSI SMG Meeting No. 24, Madrid, Spain, December 1997], a method introduced by J. van de Beek and P. O. Borjesson et al. ["A Time and Frequency Synchronization Scheme for Multiuser OFDM", and a method introduced by H. Alikhani, R. Bohnke, and M. Suzuki [BDMA (Band Division Multiple Access—A New Air-Interface for 3rd Generation Mobile System in Europe", *Proc. ACTS Summit*, Aalborg, Denmark, October 1997, pp. 482-488), a differential quadrature phase shift keying (DQPSK) modulation method and an 8-DPSK modulation method are used, a subband is composed of 22 through 25 subcarriers, and a guard interval is comprises 2 through 3 subcarriers. Therefore, a bandwidth loss of minimum 7.4% through maximum 12% is incurred. When a modulation method of higher bandwidth efficiency is used, an additional bandwidth loss may cause a decrease in transmission capacity.

SUMMARY OF THE INVENTION

Therefore, the present invention provides an uplink communication method and apparatus for transmitting upper and lower edge sidelobe canceling signals over respective subcarriers nearest to subbands transmitted among subcarriers included in a guard interval in an orthogonal frequency division multiplexing access (OFDMA) system, thereby minimizing interference between users.

The present invention also provides a method and apparatus for generating the upper and lower edge sidelobe canceling signals respectively corresponding to an inner product of each user transmission signal vector of a transmitting terminal and an optimized upper weight vector and an inner product of the user transmission signal vector of the transmitting terminal and an optimized lower weight vector.

According to an aspect of the present invention, there is provided an uplink communication method in an orthogonal frequency division multiplexing access system, comprising: generating upper and lower edge sidelobe canceling signals in a transmitting terminal for an uplink; and inserting the upper and the lower edge sidelobe canceling signals into guard intervals, respectively, adjacent to a subband allocated to a user and performing inverse fast Fourier transform on user transmission signals and the upper and the lower edge sidelobe canceling signals.

According to another aspect of the present invention, there is provided a method of generating an edge sidelobe canceling signal in an orthogonal frequency division multiplexing access system, the comprising: inputting a user transmission signal vector; generating upper and lower weight vectors $w_u$ and $w_l$ according to:

$$w_u = \frac{(A_0 + A_{M+1})A^b - 2A_{0,M+1}A^f}{(A_0 + A_{M+1})^2 - 4A_{0,M+1}^2} \text{ and}$$

$$w_l = \frac{(A_0 + A_{M+1})A^f - 2A_{0,M+1}A^b}{(A_0 + A_{M+1})^2 - 4A_{0,M+1}^2} \text{ where}$$

$$A_{p,q} = (-1)^{p-q} \int_{M_G+1-\max(\Delta\varepsilon)}^{0} P'_{\Delta\varepsilon}(\alpha)\text{sinc}(\alpha+p)\text{sinc}(\alpha+q)d\alpha$$

$$A_p = \int_{M_G+1-\max(\Delta\varepsilon)}^{0} P'_{\Delta\varepsilon}(\alpha)\text{sinc}^2(\alpha+p)d\alpha$$

$$P'_{\Delta\varepsilon}(\alpha) = \sum_{m=M_G+1}^{\infty} P_{\Delta\varepsilon}(m+\Delta\varepsilon)$$

$$A^f = \begin{bmatrix} A_{0,1} + A_{1,M+1} \\ A_{0,2} + A_{2,M+1} \\ \vdots \\ A_{0,M} + A_{M,M+1} \end{bmatrix}$$

$$A^b = \begin{bmatrix} A_{0,M} + A_{M,M+1} \\ A_{0,M-1} + A_{M-1,M+1} \\ \vdots \\ A_{0,1} + A_{1,M+1} \end{bmatrix}, \text{ and}$$

$$X_j = \begin{bmatrix} X_j(K_j) \\ X_j(K_j+1) \\ \vdots \\ X_j(K_j+M-1) \end{bmatrix} \text{ and}$$

$K_j$ denotes a parameter to determine a position of a j-th user subband, M denotes a number of subcarriers allocated to each user, $P_{\Delta\varepsilon}$ denotes a probability density function of a difference $\Delta\varepsilon$ between frequency offsets of two subbands, and $M_G+1$ indicates a minimum distance between two subcarriers included in different subbands; and performing an inner product on the user transmission signal vector and the upper weight vector to generate an upper edge sidelobe canceling signal and performing an inner product on the user transmission signal vector and the lower weight vector to generate a lower edge sidelobe canceling signal.

According to still another aspect of the present invention, there is provided an uplink communication apparatus in an orthogonal frequency division multiplexing access system, the uplink communication apparatus including a transmitting terminal which comprises: a signal mapping unit for mapping a data stream input in serial to one of a quadrature-phase shift keying (QPSK) signal and a quadrature amplitude modulation (QAM) signal; a serial-to-parallel conversion unit for converting the serial data stream mapped to one of the QPSK and QAM signals into parallel data; an edge sidelobe canceling signal generation unit for generating an upper edge sidelobe canceling signal corresponding to an inner product of a transmission signal vector of the transmitting terminal and an optimized upper weight vector and a lower edge sidelobe canceling signal corresponding to an inner product of the transmission signal vector of the transmitting terminal and an optimized lower weight vector and allocates the upper and lower edge sidelobe canceling signals to subcarriers in guard intervals, respectively; an inverse fast Fourier transform (IFFT) unit for performing IFFT on a transmission signal of the transmitting terminal allocated to subcarriers in a predetermined subband and the upper and lower edge sidelobe canceling signals allocated to the subcarriers in the guard intervals; and a guard interval insertion and parallel-to-serial conversion unit for inserting the guard intervals into the inverse fast Fourier transformed data provided from the IFFT unit, converts data resulting from the insertion into serial data, and outputs orthogonal frequency division multiplexing modulated data.

According to still another aspect of the present invention, there is provided an apparatus for generating an edge sidelobe canceling signal in an orthogonal frequency division multiplexing access system. The apparatus comprises: a storage unit for storing one of an upper weight vector and a lower weight vector and reads vectors of the upper or lower weight vector in a predetermined order according to an edge sidelobe selection signal; and a matrix operation unit for performing an inner product on a user's transmission signal vector and the upper or lower weight vector provided from the storage unit, thereby generating an upper or lower edge sidelobe canceling signal.

BRIEF DESCRIPTION OF THE DRAWINGS

The above and other objects, features, and advantages of the present invention will become more apparent by describing in detail preferred embodiments thereof with reference to the attached drawings in which.

DETAILED DESCRIPTION OF THE INVENTION

Preferred embodiments of the present invention will be described in detail herein below with reference to the attached drawings. In the drawings, the same reference numerals denote the same member.

Basically, the present invention rests on two premises; one is that statistical characteristics regarding factors, such as an error of an oscillator and a Doppler shift due to a mobility of a user's terminal, which cause each user to have a frequency offset during an uplink using an orthogonal frequency division multiplexing access (OFDMA) method can be predicted, and the other is that individual users' frequency offsets are independent in terms of statistical characteristics.

Figure 1:
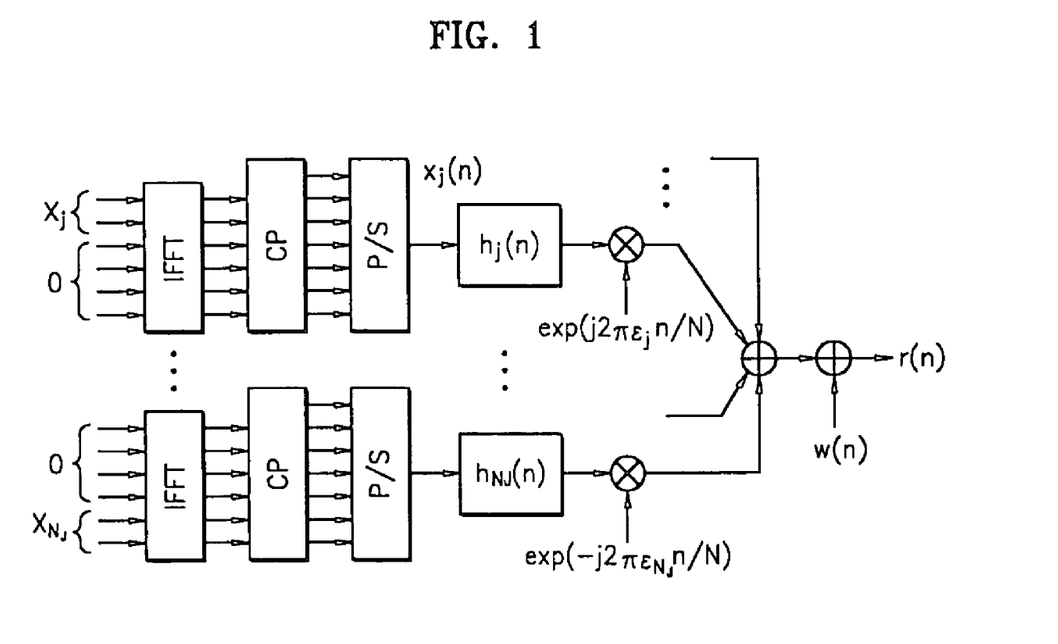
FIG. 1 is a block diagram of a transmitting terminal in an orthogonal frequency division multiplexing access (OFDMA) system employing the present invention.
Figure 2:
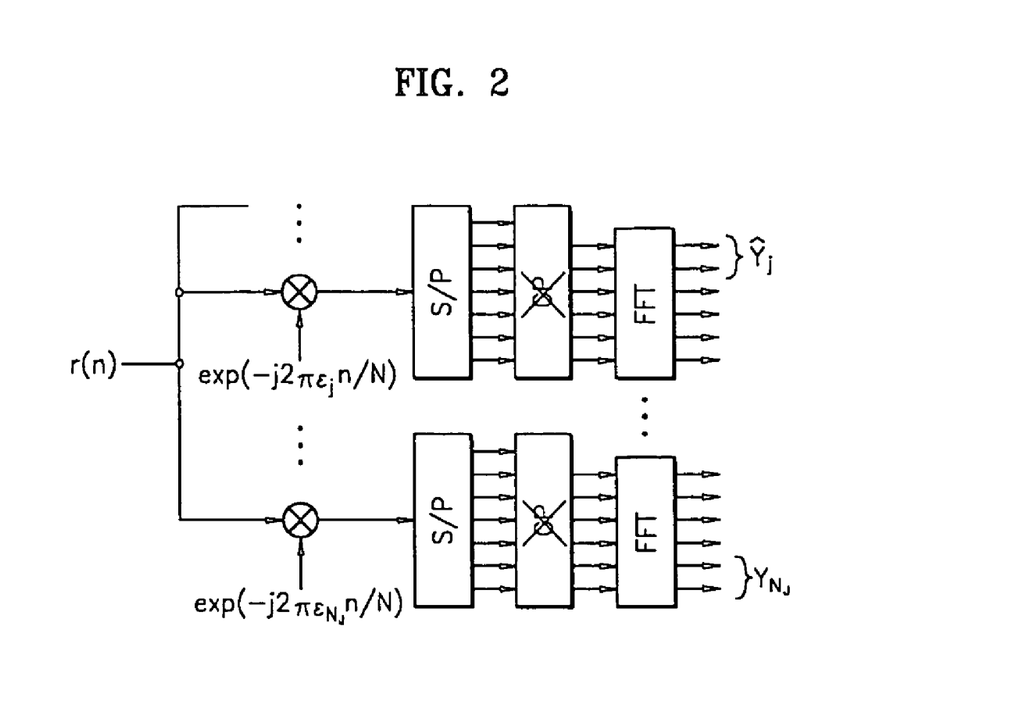
FIG. 2 is a block diagram of a receiving terminal in an OFDMA system employing the present invention.

A transmitting terminal and a receiving terminal of an OFDMA system using the present invention will be described with reference to FIGS. 1 and 2. In FIGS. 1 and 2, IFFT and FFT denote Inverse Fast Fourier Transform and Fast Fourier Transform, respectively. CP and CP(X) denote insertion of a guard interval and removal of a guard interval, respectively. P/S and S/P denote a parallel-to-serial conversion and serial-to-parallel conversion, respectively.

In the OFDMA method, M adjacent subcarriers (subchannels) among N subcarriers are grouped and allocated to a single user. When a user environment enabling $N_J$ users to simultaneously communicate with a base station is considered, a transmission signal $x_j(n)$ of a j-th user, which is generated from a transmitting terminal of an uplink, can be expressed by Equation (1).

$$x_j(n) = \frac{1}{N} \sum_{k \in B_j} X_j(k) e^{j2\pi kn/N}, \quad -G \le n \le N-1 \tag{1}$$

In Equation (1), N denotes the number of subcarriers undergoing IFFT, i.e., an IFFT size, G denotes the length of a guard interval, $x_j(n)$ denotes the j-th user's transmission signal in which a guard interval is inserted after IFFT, and $X_j(k)$ denotes a frequency domain signal of the j-th user. In addition, individual user subcarriers are not supposed to overlap each other in the OFDMA method, and therefore, a set $B_j$ of subcarriers of the j-th user in Equation (1) must satisfy Equation (2).

$$B_j = \{k | K_j \le k \le K_j + M - 1\} \tag{2}$$

In Equation (2), $K_j$ denotes the parameter to determine the location of a first subcarrier in the j-th user's subcarrier set, that is, the position of the j-th user's subband, and M denotes the number of subcarriers allocated to each user.

Each user transmission signal $x_j(n)$ modulated as shown in Equation (1) includes an independent channel and frequency offset during transmission, and a receiving terminal in the uplink, i.e., the base station, receives total $N_J$ transmission signals. Accordingly, an input signal $r_n$ of the base station can be expressed by Equation (3).

$$r(n) = \frac{1}{N} \sum_{j=1}^{N_J} e^{j2\pi \varepsilon_j n/N} \sum_{m=-\infty}^{\infty} h_j(m-n) x_j(n) + w(n) \tag{3}$$

Here, $\varepsilon_j$ denotes a frequency offset of the j-th user, $h_j(n)$ denotes a channel response function between the j-th user and the base station, and w(n) denotes an additive white gaussian noise.

When it is assumed that the j-th user's frequency offset $\varepsilon_j$ is perfectly estimated and independently compensated for user by user by the base station, a reconstructed signal $Y_{j'}(l)$ of a j'-th user can be expressed by Equation (4).

$$Y_{j'}(l) = \sum_{k \in B_{j'}} H_{j'}(k) X_{j'}(k) \delta(k-l) + \sum_{j=1, j \ne j'}^{N_J} H_j(l) \sum_{k \in B_{j'}} I_j(k) + W(l) \tag{4}$$

In Equation (4), the first term corresponds to the multiplication of a desired j'-th user's transmission signal and a channel response function corresponding thereto, and the second term corresponds to the summation of multiple access interferences. Here, multiple access interference $I_j(l)$ caused by the j'-th user can be expressed by Equation (5).

$$I_j(l) = \sum_{k \in B_j} X_j(k) \cdot e^{j\pi(k-l+\Delta\varepsilon_j)} \mathrm{sinc}(k-l+\Delta\varepsilon_j) \tag{5}$$

In Equation (5), $\Delta\varepsilon_j$ is defined as $\varepsilon_j - \varepsilon_{j'}$ and indicates a difference between the frequency offset of the j'-th user and the frequency offset of the j-th user (where $j \ne j'$). Accordingly, when signals respectively having individual users' frequency offsets $\varepsilon$ are applied to the base station, interference expressed by Equation (5) occurs.

Figure 3:
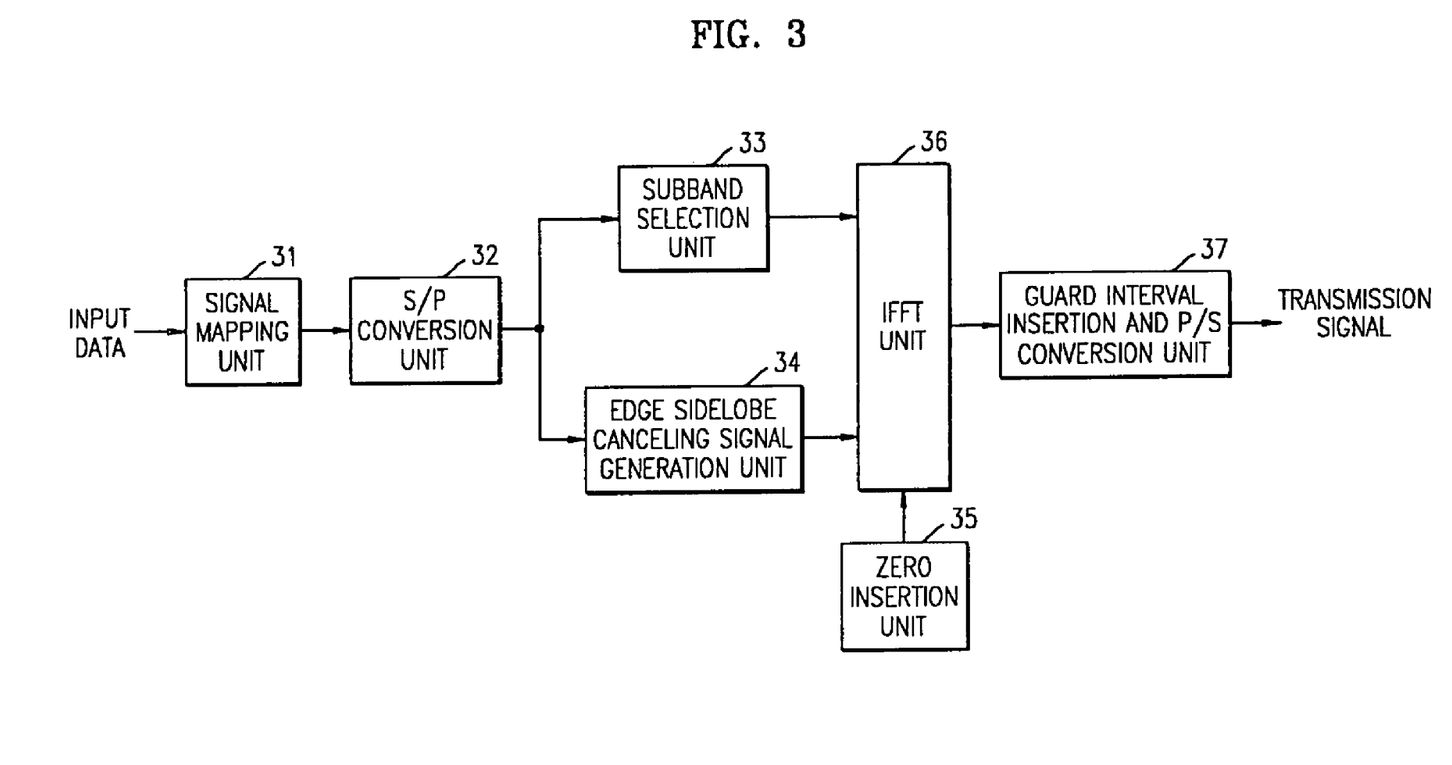
FIG. 3 is a block diagram of a transmitting terminal of an uplink communication apparatus using an OFDMA method, according to an embodiment of the present invention.

FIG. 3 is a block diagram of a transmitting terminal of an uplink communication apparatus according to an embodiment of the present invention. The transmitting terminal of an uplink communication apparatus includes a signal mapping unit 31, an S/P conversion unit 32, a subband selection unit 33, an edge sidelobe canceling signal generation unit 34, a zero insertion unit 35, an IFFT unit 36, and a guard interval insertion and P/S conversion unit 37.

Referring to FIG. 3, the signal mapping unit 31 maps a data stream input in serial to a quadrature-phase shift keying (QPSK) signal or a quadrature amplitude modulation (QAM) signal and provides the mapping result to the S/P conversion unit 32 connected to an output node of the signal mapping unit 31. The S/P conversion unit 32 converts the serial data stream mapped to the QPSK or QAM signal into parallel data. The subband selection unit 33 selects an arbitrary subband comprising M subcarriers for allocation of the signal output from the S/P conversion unit 32. The edge sidelobe canceling signal generation unit 34 generates upper and lower edge sidelobe canceling signals. The upper and lower edge sidelobe canceling signals are allocated to subcarriers that are nearest to subbands transmitted, respectively, among a plurality of subcarriers included in a guard interval and correspond to an inner product of a transmission signal vector of the transmitting terminal and an optimized upper weight vector and an inner product of the transmission signal vector of the transmitting terminal and an optimized lower weight vector, respectively. The zero insertion unit 35 inserts zeros into bands other than the subband selected by the subband selection unit 33. The IFFT unit 35 performs IFFT on a signal, which includes the selected subband and the subcarriers to which the upper and lower edge sidelobe canceling signals are allocated, respectively, and provides IFFT data resulting from performing IFFT to the guard interval insertion and P/S conversion unit 37. The guard interval insertion and P/S conversion unit 37 inserts a guard interval into the IFFT data and then converts it into serial data, thereby outputting OFDM data.

Figure 4:
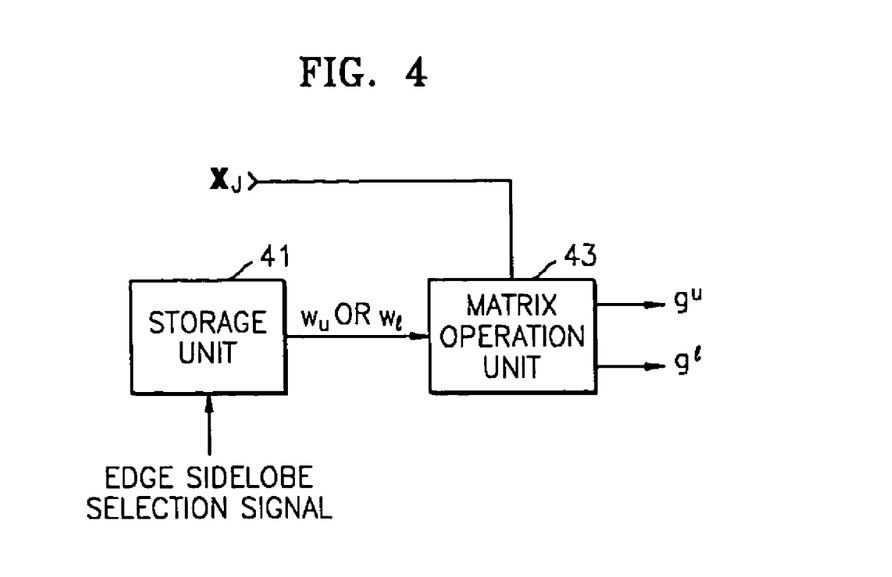
FIG. 4 is a block diagram of an embodiment of the edge sidelobe canceling signal generation unit illustrated in FIG. 3.

FIG. 4 is a block diagram of an embodiment of the edge sidelobe canceling signal generation unit 34 illustrated in FIG. 3. In the embodiment, the edge sidelobe canceling signal generation unit 34 includes a storage unit 41 and a matrix operation unit 43.

Referring to FIG. 4, the storage unit 41 is implemented by a look-up table, which has a size of M×1 when a single subband includes M subcarriers, and stores either an upper edge sidelobe weight vector $w_u$ or a lower edge sidelobe weight vector $w_l$, which is a variable for the upper and lower edge sidelobe canceling signals. Because the component vectors of the upper edge sidelobe weight vector $w_u$ have a reverse order to the component vectors of the lower edge sidelobe weight vector $w_l$, only one of the two weight vectors is configured in the look-up table, and the components of the look-up table are read in a certain order according to an edge sidelobe selection signal and provided to the matrix operation unit 43. Further, because these two weight vectors are configured as a function of a statistical characteristic of a user's frequency offset and the number of subcarriers included in a subband, a format of a reference table can be made in advance, and therefore, the complexity of the transmitting terminal rarely increases.

The matrix operation unit 43 performs an inner product on a user transmission signal vector $X_j$ output from the S/P conversion unit 32 and the upper edge sidelobe weight vector $w_u$ or the lower edge sidelobe weight vector $w_l$ output from the storage unit 41 to generate upper or lower edge sidelobe canceling signal $g^u$ or $g^l$. In other words, the matrix operation unit 43 performs as many multiplications and additions as the number, i.e., M, of the subcarriers included in the subband to generate the upper or lower edge sidelobe canceling signal $g^u$ or $g^l$.

Hereinafter, an embodiment of the present invention will be described in detail with reference to FIGS. 3 and 4.

In the present invention, to alleviate interference as expressed by Equation (5), edge sidelobe canceling signals for minimizing interference among users are generated and respectively transmitted over two subcarriers that are nearest to respective two subbands adjacent to a guard interval among subcarriers included in the guard interval. The guard interval is positioned between the two adjacent subbands and includes a predetermined number of subcarriers over which information is not transmitted.

With respect to a $(K_j-1)$-th subcarrier $X_j(K_j-1)$ and a $(K_j+M)$-th subcarrier $X_j(K_j+M)$ positioned in front and back of the j-the user's subband including M subcarriers, the lower and upper edge sidelobe canceling signals $g^l$ and $g^u$ are defined by Equation (6) according to positions at which they are inserted.

$$g^l = X_j(K_j-1)$$
$$g^u = X_j(K_j+M) \tag{6}$$

The two subcarriers including lower and upper edge sidelobe canceling signals $g^l$ and $g^u$, respectively, cancel both edge sidelobes of a transmission symbol so that interference can be prevented.

The following description concerns a method of generating the lower and upper edge sidelobe canceling signals $g^l$ and $g^u$. Specifically, when the lower and upper edge sidelobe canceling signals $g^l$ and $g^u$ are transmitted over two subcarriers, respectively, in a guard interval, an interference signal of the j-th user, $I_j^{ESC}(l)$, can be expressed by Equation (7).

$$I_j^{ESC}(l) = I_j(l) + g^u e^{j\pi(K_j+M-l+\Delta\varepsilon_j)} \operatorname{sinc}(K_j + M - l + \Delta\varepsilon_j) + g^l e^{j\pi(K_j-1-l+\Delta\varepsilon_j)} \operatorname{sinc}(K_j - 1 - l + \Delta\varepsilon_j) \tag{7}$$

An expected value of the interference signal can be quantitatively expressed by a cost function J, as shown in Equation (8).

$$J = E\left\{ \sum_{j'=1, j'\neq j}^{N_J} \sum_{l\in B_{j'}} |I_j^{ESC}(l)|^2 \right\}$$
$$= \int_{-\infty}^{\infty} \sum_{j'=1, j'\neq j}^{N_J} \sum_{l\in B_{j'}} |I_j^{ESC}(l)|^2 P_{\Delta\varepsilon_j}(\Delta\varepsilon_j) d\Delta\varepsilon_j \tag{8}$$

In Equation (8), $P_{\Delta\varepsilon_j}$ indicates a probability density function of a difference $\Delta\varepsilon_j$ between frequency offsets. Frequency offsets occurs due to discordance between oscillators and Doppler effects. The discordance between oscillators and the Doppler effects can be modeled with independent random variables. The random variables have a probability density function in proportion to a power spectral density function of an oscillator spectrum and a Doppler spectrum. More details have been disclosed in an article by P. H. Moose, ["A Technique for Orthogonal Frequency-Division Multiplexing Frequency Offset Correction," *IEEE Trans. Commun.*, vol. 42, pp. 2908-2914, October 1994].

The cost function J can be minimized by performing partial differentiation thereon and setting the partial differentiated result to 0, as shown in Equation (9).

$$\frac{\partial J}{\partial g^u} = \frac{\partial J}{\partial g^l} = 0 \tag{9}$$

The lower and upper edge sidelobe canceling signals $g^l$ and $g^u$ can be optimized using the simultaneous equation shown in Formula (9), as shown in Equations (10) and (11).

$$g^u = X_j^T \frac{(A_0 + A_{M+1})A^b - 2A_{0,M+1}A^f}{(A_0 + A_{M+1})^2 - 4A_{0,M+1}^2} = w_u X_j \tag{10}$$

$$g^l = X_j^T \frac{(A_0 + A_{M+1})A^f - 2A_{0,M+1}A^b}{(A_0 + A_{M+1})^2 - 4A_{0,M+1}^2} = w_l X_j \tag{11}$$

In other words, the lower and upper edge sidelobe canceling signals $g^l$ and $g^u$ are obtained by performing an inner product on each user's transmission signal vector of a transmitting terminal and optimized lower and upper weight vectors $w_l$ and $w_u$, respectively.

The variables used in Equations (10) and (11) are defined by Equations (12) through (14), respectively.

$$A_{p,q} = (-1)^{p-q} \int_{M_G+1-max(\Delta\varepsilon)}^{\infty} P_{\Delta\varepsilon}'(\alpha) \sin c(\alpha+p) \sin c(\alpha+q) d\alpha \tag{12}$$

$$A_p = \int_{M_G+1-max(\Delta\varepsilon)}^{\infty} P_{\Delta\varepsilon}'(\alpha) \sin c^2(\alpha+p) d\alpha \tag{13}$$

$$P_{\Delta\varepsilon}'(\alpha) = \sum_{m=M_G+1}^{\infty} P_{\Delta\varepsilon}(m+\Delta\varepsilon) \tag{14}$$

In Equations (12) through (14), $M_G+1$ indicates a minimum distance between two subcarriers included in different subbands.

The vectors $A^f$, $A^b$, and $X_j$ used in Equations (10) and (11) are defined by Equations (15) through (17), respectively.

$$A^f = \begin{bmatrix} A_{0,1} + A_{1,M+1} \\ A_{0,2} + A_{2,M+1} \\ \vdots \\ A_{0,M} + A_{M,M+1} \end{bmatrix} \tag{15}$$

-continued $$A^b = \begin{bmatrix} A_{0,M} + A_{M,M+1} \\ A_{0,M-1} + A_{M-1,M+1} \\ \vdots \\ A_{0,1} + A_{1,M+1} \end{bmatrix} \quad (16)$$

$$X_j = \begin{bmatrix} X_j(K_j) \\ X_j(K_j+1) \\ \vdots \\ X_j(K_j+M-1) \end{bmatrix} \quad (17)$$

Because the variables $A_{p,q}$ and $A_p$ used to generate the lower and upper edge sidelobe canceling signals $g^l$ and $g^u$ do not include signal information $X_j(k)$, they can be calculated using the characteristic function of an oscillator used in the system or a characteristic of the Doppler spectrum in advance. Accordingly, the transmitting terminal does not perform the calculations to obtain these variables, but it just stores the optimized lower and upper weight vectors $w_l$ and $w_u$ in advance and multiplies them by the transmission signal vector $X_j$ to obtain the lower and upper edge sidelobe canceling signals $g^l$ and $g^u$. In addition, because the optimized lower and upper weight vectors $w_l$ and $w_u$ are in reverse order to each other, they can be stored in only a real number search table having a size of M×1.

Figure 5:
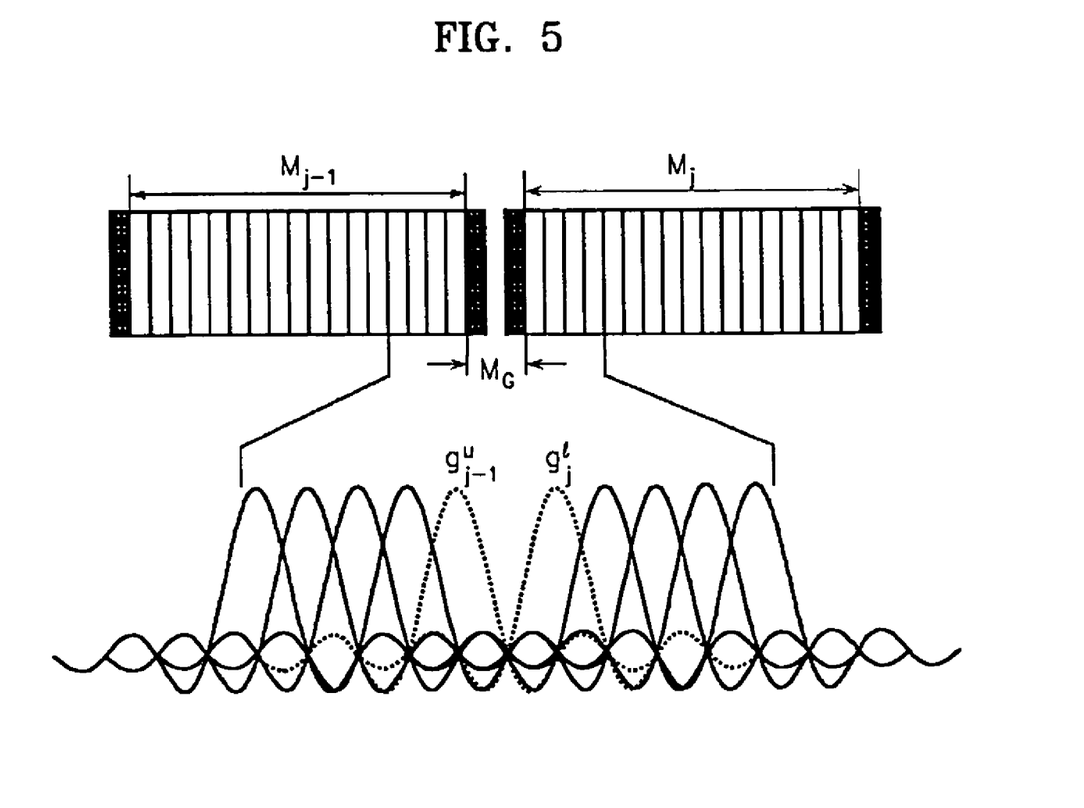
FIG. 5 is a diagram of a frequency allocation structure in which edge sidelobe canceling signals are included in a guard interval.

FIG. 5 is a diagram of a frequency allocation structure in which edge sidelobe canceling signals are included in a guard interval. A guard interval $M_G$ is disposed between a subband, i.e., a set $M_{j-l}$ of M subcarriers, allocated to a (j−1)-th user and a subband, i.e., a set $M_j$ of M subcarriers, allocated to the j-th user. Here, an upper edge sidelobe canceling signal $g^u_{j-1}$ of the (j−1)-th user's subband and the lower edge sidelobe canceling signal $g^l_j$ of the j-th user subband are respectively inserted into subcarriers which are nearest to the two subbands, respectively, among subcarriers included in the guard interval $M_G$, i.e., which are positioned at both ends, respectively, of the guard interval $M_G$.

The above-described preferred embodiments of the present invention can be realized as programs, which can be executed in a universal digital computer through a computer readable recording medium. The computer readable recording medium may be a storage media, such as a magnetic storage medium (for example, a ROM, a floppy disc, or a hard disc), or an optical readable medium (for example, a CD-ROM or DVD).

Hereinafter, the results of evaluating the performance of the present invention will be described with reference to FIGS. 6 through 9.

In the evaluations, a single OFDM signal included a total of 1024 subcarriers. Among the 1024 subcarriers, 256 subcarriers were used for pulse shaping. Each subband allocated to a user included 22 subcarriers. A guard interval disposed between two adjacent subbands to alleviate interference between the two adjacent subbands included 2 subcarriers. Accordingly, 32 subbands could be allocated to users in a single OFDM signal. Among the 32 subbands, an arbitrary subband was exclusively selected for each user.

Figure 6:
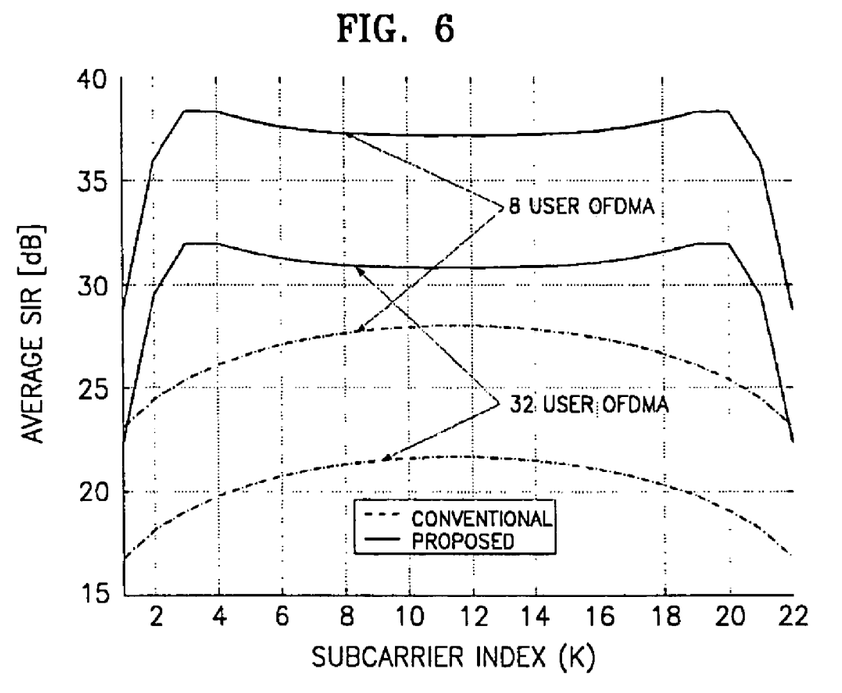
FIG. 6 is a graph illustrating average signal-to-interference ratios (SIRs) of subcarriers where the present invention is used and is not used in a white noise channel.

FIG. 6 is a graph illustrating average signal-to-interference ratios (SIR) of 22 subcarriers k in cases where the present invention was used and was not used for 8 and 32 users in a white noise channel. It was assumed that power was completely controlled such that transmission signals output from transmitting terminals, i.e., individual users' terminals, reached a receiving terminal, i.e., a base station, at the same strength. Dashed lines denote where only a guard interval was used to alleviate interference according to conventional technology. Solid lines denote where all of the transmitting terminals inserted edge sidelobe canceling signals in the transmission signals according to the proposed present invention. When the present invention was employed, the average SIR was improved by about 10 dB with respect to almost all of the subcarriers.

Figure 7:
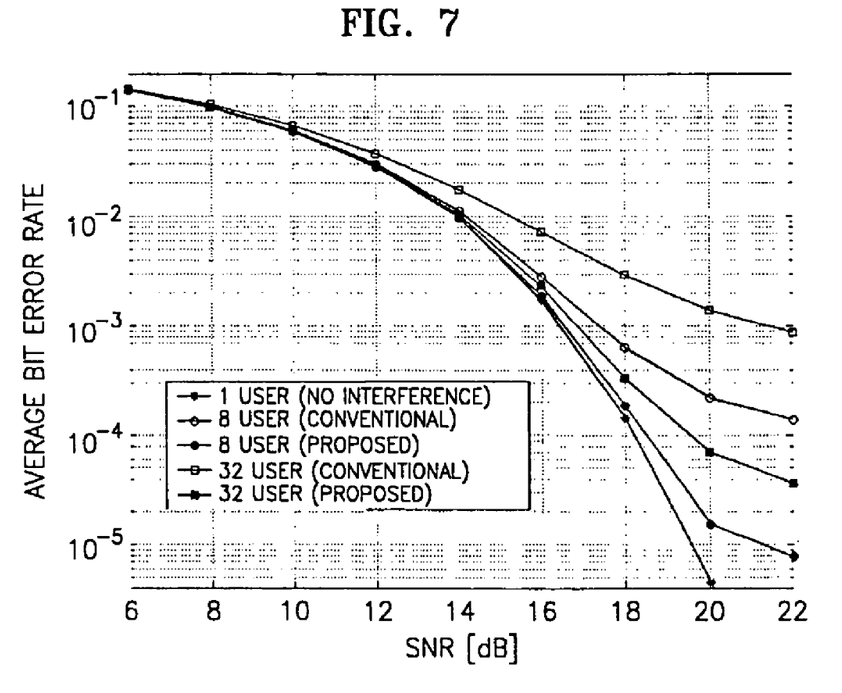
FIG. 7 is a graph illustrating an average bit error rate versus a signal-to-noise ratio (SNR) where the present invention is used and is not used in a white noise channel.

FIG. 7 is a graph illustrating an average bit error rate versus a signal-to-noise ratio (SNR) where channel coding was not performed when a 16 QAM method was used in the white noise channel. Generally, with an increase in the number of users, the amount of interference increases, and therefore, an average bit error rate does not decrease even at a very high SNR. The present invention decreased the average bit error rate so that when there were 8 users, it showed good performance as if a sole user transmitted a signal without interference.

Figure 8:
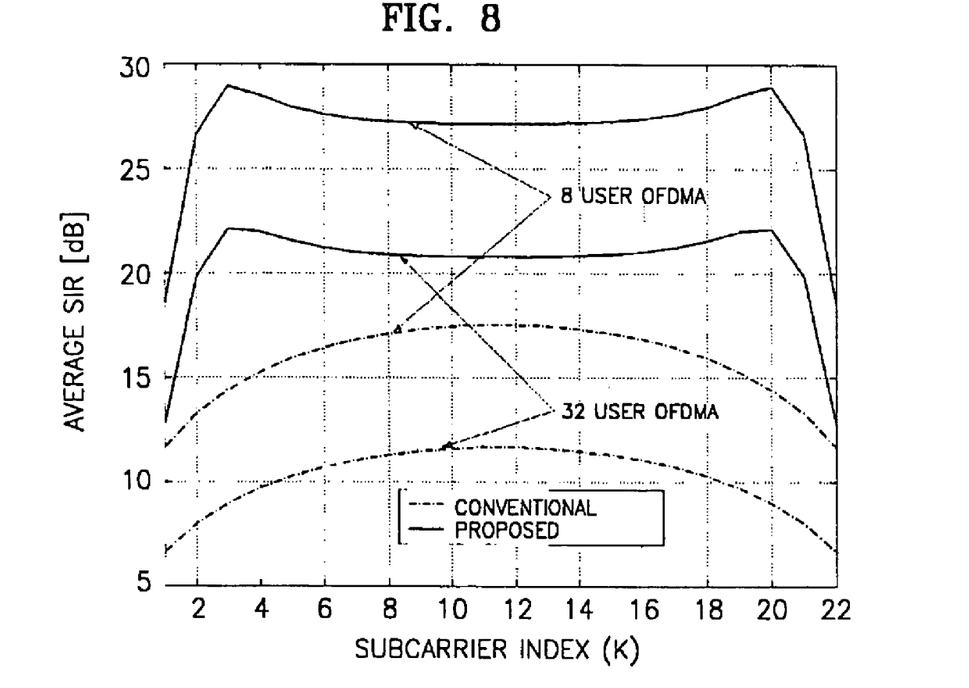
FIG. 8 is a graph illustrating average SIRs of subcarriers where the present invention is used and is not used in a Rayleigh fading channel.

FIG. 8 is a graph illustrating average SIRs of 22 subcarriers included in a single subband where the present invention was employed and was not employed for 8 and 32 users in a Rayleigh fading channel. It was assumed that power was incompletely controlled such that transmission signals output from respective user terminals reached a receiving terminal at a strength showing a Rayleigh distribution. When the present invention was employed, similarly to the cases illustrated in FIG. 6, the average SIR was improved by about 10 dB with respect to almost all of the subcarriers.

Figure 9:
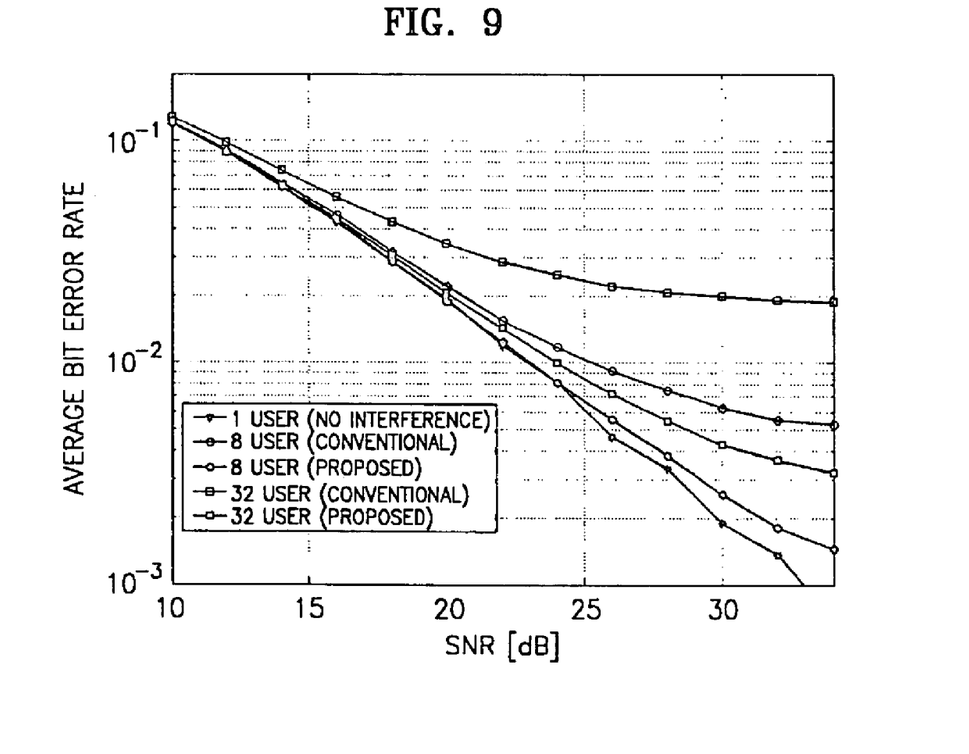
FIG. 9 is a graph illustrating an average bit error rate versus an SNR where the present invention is used and is not used in a Rayleigh fading channel.

FIG. 9 is a graph illustrating an average bit error rate versus an SNR where channel coding was not performed when a 16 QAM method was used in the Rayleigh fading channel. Like the cases illustrated in FIG. 8, it was assumed that transmission signals output from respective user terminals reached a receiving terminal at a strength showing a Rayleigh distribution. Similarly to the cases illustrated in FIG. 7, when there were 8 users, the present invention showed good performance as if a sole user transmitted a signal without interference.

As described above, according to the present invention, each transmitting terminal generates upper and lower edge sidelobe canceling signals, respectively inserts them into guard intervals, and performs IFFT on a transmission signal and the upper and lower edge sidelobe canceling signals when transmitting the transmission signal in an uplink communication system using OFDMA so that interference between users can be minimized without causing an additional loss of a bandwidth. In addition, the present invention can be used together with a conventional interference suppression algorithm using a window.

Because the upper and lower edge sidelobe canceling signals respectively correspond to an inner product of a transmission signal vector of a user transmitting terminal and an optimized upper weight vector and an inner product of the transmission signal vector of the transmitting terminal and an optimized lower weight vector, they can be generated using only a memory, which stores a real number search table as large as a subband allocated to each user, and a multiplier and an adder, which are as large as the subband. Accordingly, the present invention alleviates interference between users without increasing the complexity of the system.

Although preferred embodiments of the present invention have been shown and described, it will be appreciated by those skilled in the art that changes may be made in these elements without departing from the principles and spirit of the invention, the scope of which is defined in the appended claims and their equivalents.

What is claimed is:

1. An uplink communication method in an orthogonal frequency division multiplexing access system, the method comprising:

generating upper and lower edge sidelobe canceling signals in a transmitting terminal for an uplink, the upper and lower edge sidelobe canceling signals being obtained by performing an inner product on a transmission signal vector of a transmitting terminal and an optimized upper weight vector and performing an inner product on the transmission signal vector of the transmitting terminal and an optimized lower weight vector, respectively; and inserting the upper and the lower edge sidelobe canceling signals into guard intervals, respectively, adjacent to a subband allocated to a user and performing inverse fast Fourier transform on user transmission signals and the upper and the lower edge sidelobe canceling signals to be inserted into the guard intervals.

2. The uplink communication method of claim 1, wherein the upper and the lower edge sidelobe canceling signals are transmitted over subcarriers, respectively, nearest to the subband among subcarriers included in the respective guard intervals.

3. A method of generating an edge sidelobe canceling signal in an orthogonal frequency division multiplexing access system, the method comprising:

inputting a user's transmission signal vector $X_j$;

generating upper and lower weight vectors $w_u$ and $w_l$ by performing the following formulae:

$$w_u = \frac{(A_0 + A_{M+1})A^b - 2A_{0,M+1}A^f}{(A_0 + A_{M+1})^2 - 4A_{0,M+1}^2} \text{ and}$$

$$w_l = \frac{(A_0 + A_{M+1})A^f - 2A_{0,M+1}A^b}{(A_0 + A_{M+1})^2 - 4A_{0,M+1}^2} \text{ where}$$

$$A_{p,q} = (-1)^{p-q} \int_{M_G+1-\max(\Delta\varepsilon)}^{0} P'_{\Delta\varepsilon}(\alpha)\text{sinc}(\alpha+p)\text{sinc}(\alpha+q)d\alpha$$

$$A_p = \int_{M_G+1-\max(\Delta\varepsilon)}^{0} P'_{\Delta\varepsilon}(\alpha)\text{sinc}^2(\alpha+p)d\alpha$$

$$P'_{\Delta\varepsilon}(\alpha) = \sum_{m=M_G+1}^{\infty} P_{\Delta\varepsilon}(m+\Delta\varepsilon)$$

$$A^f = \begin{bmatrix} A_{0,1} + A_{1,M+1} \\ A_{0,2} + A_{2,M+1} \\ \vdots \\ A_{0,M} + A_{M,M+1} \end{bmatrix}$$

$$A^b = \begin{bmatrix} A_{0,M} + A_{M,M+1} \\ A_{0,M-1} + A_{M-1,M+1} \\ \vdots \\ A_{0,1} + A_{1,M+1} \end{bmatrix}, \text{ and}$$

$$X_j = \begin{bmatrix} X_j(K_j) \\ X_j(K_j+1) \\ \vdots \\ X_j(K_j+M-1) \end{bmatrix} \text{ and}$$

$X_j$ denotes a user's transmission signal vector, $K_j$ denotes the parameter to determine the position of the j-th user's subband, M denotes the number of subcarriers allocated to each user, $P_{\Delta\varepsilon}$ denotes a probability density function of a difference $\Delta\varepsilon$ between frequency offsets of two subbands, and $M_G+1$ indicates a minimum distance between two subcarriers included in different subbands;

performing an inner product on the user's transmission signal vector and the upper weight vector to generate an upper edge sidelobe canceling signal and performing an inner product on the user's transmission signal vector and the lower weight vector to generate a lower edge sidelobe canceling signal; and outputting the upper edge sidelobe canceling signal and the lower edge sidelobe canceling signal so as to be allocated in guard intervals.

4. A computer readable medium tangibly embodying a program of instructions executable by a computer to perform method steps for a method of generating an edge sidelobe canceling signal in an orthogonal frequency division multiplexing access system, the method comprising:

inputting a user's transmission signal vector $X_j$;

generating upper and lower weight vectors $w_u$ and $w_l$ by performing the following formulae:

$$w_u = \frac{(A_0 + A_{M+1})A^b - 2A_{0,M+1}A^f}{(A_0 + A_{M+1})^2 - 4A_{0,M+1}^2} \text{ and}$$

$$w_l = \frac{(A_0 + A_{M+1})A^f - 2A_{0,M+1}A^b}{(A_0 + A_{M+1})^2 - 4A_{0,M+1}^2} \text{ where}$$

$$A_{p,q} = (-1)^{p-q} \int_{M_G+1-\max(\Delta\varepsilon)}^{0} P'_{\Delta\varepsilon}(\alpha)\text{sinc}(\alpha+p)\text{sinc}(\alpha+q)d\alpha$$

$$A_p = \int_{M_G+1-\max(\Delta\varepsilon)}^{0} P'_{\Delta\varepsilon}(\alpha)\text{sinc}^2(\alpha+p)d\alpha$$

$$P'_{\Delta\varepsilon}(\alpha) = \sum_{m=M_G+1}^{\infty} P_{\Delta\varepsilon}(m+\Delta\varepsilon)$$

$$A^f = \begin{bmatrix} A_{0,1} + A_{1,M+1} \\ A_{0,2} + A_{2,M+1} \\ \vdots \\ A_{0,M} + A_{M,M+1} \end{bmatrix}$$

$$A^b = \begin{bmatrix} A_{0,M} + A_{M,M+1} \\ A_{0,M-1} + A_{M-1,M+1} \\ \vdots \\ A_{0,1} + A_{1,M+1} \end{bmatrix}, \text{ and}$$

$$X_j = \begin{bmatrix} X_j(K_j) \\ X_j(K_j+1) \\ \vdots \\ X_j(K_j+M-1) \end{bmatrix} \text{ and}$$

$X_j$ denotes a user's transmission signal vector, $K_j$ denotes the parameter to determine the position of the j-th user's subband, M denotes the number of subcarriers allocated to each user, $P_{\Delta\varepsilon}$ denotes a probability density function of a difference $\Delta\varepsilon$ between frequency offsets of two subbands, and $M_G+1$ indicates a minimum distance between two subcarriers included in different subbands;

performing an inner product on the user's transmission signal vector and the upper weight vector to generate an upper edge sidelobe canceling signal and performing an inner product on the user's transmission signal vector and the lower weight vector to generate a lower edge sidelobe canceling signal; and outputting the upper edge sidelobe canceling signal and the lower edge sidelobe canceling signal so as to be allocated in guard intervals.

5. An uplink communication apparatus in an orthogonal frequency division multiplexing access system, the uplink communication apparatus including a transmitting terminal comprising:

a signal mapping unit for mapping a data stream input in serial to one of a quadrature-phase shift keying (QPSK) signal and a quadrature amplitude modulation (QAM) signal;

a serial-to-parallel conversion unit for converting the serial data stream mapped to one of the QPSK and QAM signals into parallel data;

an edge sidelobe canceling signal generation unit for generating an upper edge sidelobe canceling signal corresponding to an inner product of a transmission signal vector of the transmitting terminal and an optimized upper weight vector, and a lower edge sidelobe canceling signal corresponding to an inner product of the transmission signal vector of the transmitting terminal and an optimized lower weight vector, and for allocating the upper and the lower edge sidelobe canceling signals to subcarriers in guard intervals, respectively;

an inverse fast Fourier transform (IFFT) unit for performing IFFT on a transmission signal of the transmitting terminal allocated to subcarriers in a predetermined subband and the upper and the lower edge sidelobe canceling signals allocated to the subcarriers in the guard intervals; and a guard interval insertion and parallel-to-serial conversion unit for inserting the guard intervals into the IFFT data provided from the IFFT unit, converting data resulting from the insertion into serial data, and outputting orthogonal frequency division multiplexing modulated data.

6. The uplink communication apparatus of claim 5, wherein the upper and the lower edge sidelobe canceling signals are transmitted over the subcarriers, respectively, nearest to the predetermined subband among subcarriers included in the respective guard intervals.

7. An apparatus for generating an edge sidelobe canceling signal in an orthogonal frequency division multiplexing access system, the apparatus comprising:

a storage unit for storing one of an upper weight vector and a lower weight vector and reading vectors of one of the upper and the lower weight vector in a predetermined order according to an edge sidelobe selection signal; and a matrix operation unit for performing an inner product on a user transmission signal vector and one of the upper and the lower weight vector provided from the storage unit, thereby generating one of an upper and a lower edge sidelobe canceling signal, wherein the apparatus generates an upper edge sidelobe canceling signal corresponding to an inner product of a transmission signal vector of the transmitting terminal and an optimized upper weight vector, and a lower edge sidelobe canceling signal corresponding to an inner product of the transmission signal vector of the transmitting terminal and an optimized lower weight vector, and allocates the upper and the lower edge sidelobe canceling signals to subcarriers in guard intervals, respectively.

8. The apparatus of claim 7, wherein when a single subband comprises M subcarriers, the storage unit is implemented by a look-up table having a size of M×1.

9. The apparatus of claim 7, wherein the upper and the lower edge sidelobe canceling signals are each a function of a statistical characteristic of a frequency offset of the transmitting terminal and a number of the subcarriers included in the subband.

* * * * *